: US 10,643,605 B2
(45) Date of Patent: May 5, 2020

(12) United States Patent
Ryu et al.

(54) AUTOMATIC MULTI-PERFORMANCE EVALUATION SYSTEM FOR HYBRID SPEECH RECOGNITION (71) Applicant: Mediazen, Inc., Seongnam-si, Gyeonggi-do (KR)

(72) Inventors: Seung Pyo Ryu, Yongin-si (KR); Min Kyu Song, Yongin-si (KR)

(73) Assignee: MEDIAZEN, INC., Seongnam-si, Gyeonggi-do (KR)

( * ) Notice: Subject to any disclaimer, the term of this patent is extended or adjusted under 35 U.S.C. 154(b) by 148 days.

(21) Appl. No.: 15/757,751

(22) PCT Filed: Sep. 7, 2017

(86) PCT No.: PCT/KR2017/009832
§ 371 (c)(1),
(2) Date: Mar. 6, 2018

(87) PCT Pub. No.: WO2018/070668
PCT Pub. Date: Apr. 19, 2018

(65) Prior Publication Data
US 2018/0342236 A1 Nov. 29, 2018

(30) Foreign Application Priority Data
Oct. 11, 2016 (KR) .................. 10-2016-0131527

(51) Int. Cl.
*G10L 15/01* (2013.01)
*G10L 15/20* (2006.01)
*G10L 15/08* (2006.01)

(52) U.S. Cl.
CPC .............. *G10L 15/08* (2013.01); *G10L 15/01* (2013.01); *G10L 15/20* (2013.01)

(58) Field of Classification Search
CPC ......... G10L 15/20; G10L 15/32; G10L 15/30; G10L 15/01; G06F 12/00; G06K 9/00248
USPC .................................. 711/147; 704/225, 201
See application file for complete search history.

(56) References Cited

U.S. PATENT DOCUMENTS

| | | | | |
|---|---|---|---|---|
| 2002/0135618 | A1* | 9/2002 | Maes | G06K 9/00248 |
| | | | | 715/767 |
| 2012/0330651 | A1* | 12/2012 | Obuchi | G10L 15/01 |
| | | | | 704/225 |
| 2013/0151817 | A1* | 6/2013 | Lahteenmaki | G06F 9/30087 |
| | | | | 712/208 |

(Continued)

FOREIGN PATENT DOCUMENTS

| | | |
|---|---|---|
| JP | 2013-064777 A | 4/2013 |
| KR | 10-2009-0013876 A1 | 2/2009 |
| KR | 10-2015-0134993 A | 12/2015 |

*Primary Examiner* — Akwasi M Sarpong
(74) *Attorney, Agent, or Firm* — Rabin & Berdo, P.C.

(57) ABSTRACT

The present invention relates to an automatic multi-performance evaluation system for hybrid speech recognition and, more particularly, to an automatic multi-performance evaluation system for hybrid speech recognition capable of automatically evaluating a processing result of speech recognition and language understanding through a hybrid terminal and a processing result of server speech recognition and language understanding through a cloud server by simultaneously using the hybrid terminal and the cloud server, to thereby output an accurate and fast performance and function verification result.

5 Claims, 4 Drawing Sheets (56) References Cited

U.S. PATENT DOCUMENTS

2013/0219130 A1* 8/2013 Zetterman ............ G06F 12/084
  711/147
2016/0275950 A1* 9/2016 Ogawa ................ G10L 15/10
2017/0206903 A1 7/2017 Kim et al.

* cited by examiner

AUTOMATIC MULTI-PERFORMANCE EVALUATION SYSTEM FOR HYBRID SPEECH RECOGNITION

TECHNICAL FIELD

The present invention relates to an automatic multi-performance evaluation system for hybrid speech recognition and, more particularly, to an automatic multi-performance evaluation system for hybrid speech recognition capable of automatically evaluating a processing result of speech recognition and language understanding through a hybrid terminal and a processing result of server speech recognition and language understanding through a cloud server by simultaneously using the hybrid terminal and the cloud server, to thereby output an accurate and fast performance and function verification result.

BACKGROUND ART

Speech recognition refers to technology of analyzing, by a computer, voice of a user input through a microphone, extracting features, recognizing a result of approximating previously input words or sentences as a command, and performing an operation corresponding to the recognized command.

A conventional speech recognition system has separately used, according to service purpose, an embedded speech recognition scheme in which a speech recognition engine is embedded in the interior of a terminal such as a vehicle or a mobile device and a cloud based server speech recognition scheme for Internet voice search through a smartphone and various information processing.

Hybrid speech recognition technology, which can use an advantage of a high recognition rate of embedded speech recognition based on a recognition grammar and an advantage of server speech recognition based on sentence unit recognition, has been applied to the market.

For hybrid speech recognition, two or more result values may be received by simultaneously driving an embedded speech recognition engine and a server speech recognition engine with respect to one utterance of a user and an arbitration algorithm, which uses the better one of the two or more result values to execute a command, serves a core role in hybrid speech recognition.

A result of embedded speech recognition is usually generated as a word, a result of server speech recognition is usually generated as a sentence, and a result of a language understanding module is usually generated as an intention and one or more object slots. In this way, different types of results are variably derived according to a situation. Accordingly, a conventional speech recognition evaluation system has a difficulty in evaluating hybrid speech recognition.

A conventional automatic speech recognition test has usually not considered an actual vehicle test environment. That is, a batch scheme, in which a speech recognition system is installed in a personal computer and results obtained by automatically inputting recognition target vocabularies in the computer are collected, and a volume arbitration scheme, in which the ratio of noise to voice is automatically adjusted when a test environment is provided, have focused upon technology of the conventional speech recognition test.

However, since recent speech recognition requires integrated performance verification for a hybrid scheme in which embedded speech recognition and cloud-based server speech recognition, which are different in specifications of recognition results, are simultaneously driven, an algorithm capable of incorporating and analyzing results of different specifications and a method of operating the algorithm are needed.

In particular, a conventional automatic evaluation system for speech recognition has developed into an automatic voice database (DB) output device for measuring a speech recognition rate or an arbitration device for arbitrating a noise environment.

However, since recent speech recognition requires integrated performance verification for a hybrid scheme in which embedded speech recognition and cloud-based server speech recognition, which are different in specifications of recognition results, are simultaneously driven, an algorithm capable of incorporating and analyzing results of different specifications and a method of operating the algorithm are needed.

For example, in the case of a vehicle speech recognition system, multilingual native speakers are directly boarded in a vehicle in a high-speed traveling environment for an actual vehicle test and are directed to utter determined commands. Then, a checker who is also boarded in the vehicle manually checks a recognition result.

However, such a vehicle test scheme encounters various problems regarding casting a few hundred native speakers, guiding the native speakers to a test place, managing the native speakers, safety according to a high-speed traveling situation, deterioration of efficiency according to manual recording of the recognition result, much time consumption in refining and analyzing enormous volumes of results, and impossibility of a repetitive test. Accordingly, it is difficult to perform enough tests to calculate meaningful statistical results and thus technology for solving this problem is needed.

DETAILED DESCRIPTION OF THE INVENTION

Technical Problems

Therefore, the present invention has been made in view of the above problems, and it is a first object of the present invention to individually or complexly analyze automatic verification of a speech recognition result of a hybrid terminal, automatic verification of a language understanding result of the hybrid terminal, automatic verification of a speech recognition result of a cloud server, automatic verification of a language understanding result of the cloud server, and verification of an arbitration result of the interior of a system and to output the analyzed result.

A second object of the present invention is to provide functions for simultaneously processing various speech recognition results in a hybrid terminal and a cloud server so that performance of simple and repeated automation, which has conventionally been individually performed throughout several trials, can be upgraded through a high-efficiency system capable of performing incorporated processing.

A third object of the present invention is to provide an automatic evaluation system for hybrid speech recognition for analyzing a recognition process performed in the interior of a hybrid speech recognition platform through logs and automatically evaluating performance of speech recognition and to greatly raise reliability of performance evaluation by providing multiple functions such as screen output matching, voice assistant output matching, and recording of test environment information.

A fourth object of the present invention is to raise reliability of vehicle speech recognition performance evaluation and enable systematic management for environment information by transmitting information about various test environments to a result output unit and mapping the information to multi-performance results, by linkage through a speech recognition evaluation environment recorder between a camera image unit capable of confirming a road surface, weather, and a surrounding situation and a controller area network (CAN) communication analyzer capable of being aware of speed, engine state, air conditioner state, etc. through CAN communication information in an environment in which a vehicle actually travels.

Technical Solutions

To accomplish the above and other objects of the present invention, an automatic multi-performance evaluation system for hybrid speech recognition include a hybrid terminal 100 including an embedded language understanding unit 140 including a natural language processing module, configured to extract a command target value of a user from a speech recognition result text processed by the natural language processing module, an embedded speech recognition engine unit 130 configured to recognize a result of approximating to a pre-input word or sentence as a command based on the extracted command target value of the user and extract a recognition result value, a result arbitrator 150 configured to compare the command target value extracted from the speech recognition result text provided by the embedded language understanding unit, the recognition result value extracted by recognizing the result of approximating to the pre-input word or sentence provided by the embedded speech recognition engine unit as the command, an extracted command target value of the user provided by a server language understanding unit of a cloud server, and a speech recognition result value provided by a server speech recognition engine unit of the cloud server, designate any one recognition result value as a driving command value, and provide the designated value to a hybrid speech recognition middleware unit, the hybrid speech recognition middleware unit 120 configured to store the driving command value provided by the result arbitrator in a log unit 400, the log unit 140 in which the driving command value is stored, and an interface unit 110 connected to a speech recognition evaluation automation device 300, for providing log information stored in the log unit;

the cloud server 200 including the server language understanding unit 220 configured to acquire voice transmitted by the hybrid terminal and extract the command target value of the user, and the server speech recognition engine unit 210 configured to extract the speech recognition result value based on the command target value of the user; and the speech recognition evaluation automation device 300 including an automatic wakeup controller 370 configured to provide a speech recognition driving command to an automation controller when a voice button is pressed, the automation controller 310 configured to provide the log information provided by the interface unit of the hybrid terminal to a log analyzer upon acquiring the speech recognition driving command value, the log analyzer 320 configured to start or end speech recognition using information about a speech recognition start time point and a speech recognition end time point analyzed based on the log information, an integrated result analyzer 330 configured to analyze, based on the log information, the command target value extracted from the speech recognition result text of the hybrid terminal, the recognition result value extracted by recognizing the result of approximating to the pre-input word or sentence as the command, the extracted command target value of the cloud server, the speech recognition result value, and the driving command value designated by the result arbitrator and calculating an evaluation result, a matching result analyzer 340 configured to analyze whether a result value identical to a user voice command is output on a terminal screen and analyze whether a voice confirmation announcement matching the user voice command is output, a speech recognition evaluation environment recorder 350 configured to record surrounding environment information when speech recognition is performed with reference to a camera image stored in a memory and CAN communication information, and a result output unit 360 configured to simultaneously output the evaluation result calculated by the integrated result analyzer, a matching verification result analyzed by the matching result analyzer, and the surrounding environment information recorded by the speech recognition evaluation environment recorder.

Advantageous Effects

According to the present invention, an automatic multi-performance evaluation system for hybrid speech recognition can individually or complexly analyze automatic verification of a speech recognition result of a hybrid terminal, automatic verification of a language understanding result of the hybrid terminal, automatic verification of a speech recognition result of a cloud server, automatic verification of a language understanding result of the cloud server, and verification of an arbitration result of the interior of the system and output the analyzed result.

In addition, functions for simultaneously processing various speech recognition results in a hybrid terminal and a cloud server can be provided so that performance of simple and repeated automation, which has conventionally been individually performed throughout several trials, can be upgraded through a high-efficiency system capable of performing incorporated processing.

In addition, an automatic evaluation system for hybrid speech recognition for analyzing a recognition process performed in the interior of a hybrid speech recognition platform through logs and automatically evaluating performance of speech recognition can be provided. Simultaneously, reliability of performance evaluation can be greatly raised by providing multiple functions such as matching of screen output, matching of voice assistant output, and recording of test environment information.

That is, results of screen output verification and voice output verification are provided to a result analyzer and are mapped to evaluation results processed by an integrated result analyzer, so that recognition performance and operation performance can be complexly evaluated.

For example, usually, since recognition performance and operation performance are separately measured, twice as much time is consumed. However, according to the present invention, evaluation of two items can be automatically performed simultaneously.

In addition, reliability of vehicle speech recognition performance evaluation can be raised and systematic management for environment information can be performed, by transmitting information about various test environments to a result output unit and mapping the information to multi-performance results, by linkage through a speech recognition evaluation environment recorder between a camera image unit capable of confirming a road surface, weather, and a surrounding situation and a CAN communication analyzer capable of being aware of speed, engine state, air conditioner state, etc. through CAN communication information, in an environment in which a vehicle actually travels.

Description of Reference Numerals
100: Hybrid terminal
200: Cloud server
300: Speech recognition evaluation automation device Best Mode for Carrying out the Invention The following disclosure illustrates only the principles of the present invention. Therefore, those skilled in the art may embody this invention in many alternate forms which are not clarified or illustrated herein but realize the principles of the invention and fall within the scope of the invention.

Further, it should be understood that, principle, all conditional terms and embodiments used herein are clearly for the purpose of describing the concept of the invention to be understood and are not intended to be limiting of the particular embodiments and conditions of the invention set forth herein.

Means for solving the objects of the present invention are as follows.

That is, an automatic multi-performance evaluation system for hybrid speech recognition according to the present invention includes a hybrid terminal 100, including an embedded language understanding unit 140 including a natural language processing module, for extracting a command target value of a user from a speech recognition result text processed by the natural language processing module, an embedded speech recognition engine unit 130 for recognizing a result of approximating to a pre-input word or sentence as a command based on the extracted command target value of the user and extracting a recognition result value, a result arbitrator 150 for comparing the command target value extracted from the speech recognition result text provided by the embedded language understanding unit, the recognition result value extracted by recognizing the result of approximating to the pre-input word or sentence provided by the embedded speech recognition engine unit as the command, an extracted command target value of the user provided by a server language understanding unit of a cloud server, and a speech recognition result value provided by a server speech recognition engine unit of the cloud server, designating any one recognition result value as a driving command value, and providing the designated value to a hybrid speech recognition middleware unit, the hybrid speech recognition middleware unit 120 for storing the driving command value provided by the result arbitrator in a log unit 400, the log unit 140 in which the driving command value is stored, and an interface unit 110 connected to a speech recognition evaluation automation device 300, for providing log information stored in the log unit;

the cloud server 200 including the server language understanding unit 220 for acquiring voice transmitted by the hybrid terminal and extracting the command target value of the user, and the server speech recognition engine unit 210 for extracting the speech recognition result value based on the command target value of the user; and the speech recognition evaluation automation device 300 including an automatic wakeup controller 370 for providing a speech recognition driving command to an automation controller when a voice button is pressed, the automation controller 310 for providing the log information provided by the interface unit of the hybrid terminal to a log analyzer upon acquiring the speech recognition driving command value, the log analyzer 320 for starting or ending speech recognition using information about a speech recognition start time point and a speech recognition end time point analyzed based on the log information, an integrated result analyzer 330 for analyzing, based on the log information, the command target value extracted from the speech recognition result text of the hybrid terminal, the recognition result value extracted by recognizing the result of approximating to the pre-input word or sentence as the command, the extracted command target value of the cloud server, the speech recognition result value, and the driving command value designated by the result arbitrator and calculating an evaluation result, a matching result analyzer 340 for analyzing whether a result value identical to a user voice command is output on a terminal screen and analyzing whether a voice confirmation announcement matching the user voice command is output, a speech recognition evaluation environment recorder 350 for recording surrounding environment information when speech recognition is performed with reference to a camera image stored in a memory and CAN communication information, and a result output unit 360 for simultaneously outputting the evaluation result calculated by the integrated result analyzer, a matching verification result analyzed by the matching result analyzer, and the surrounding environment information recorded by the speech recognition evaluation environment recorder.

Hereinafter, an embodiment of an automatic multi-performance evaluation system for hybrid speech recognition according to the present invention will be described in detail.

Figure 1:
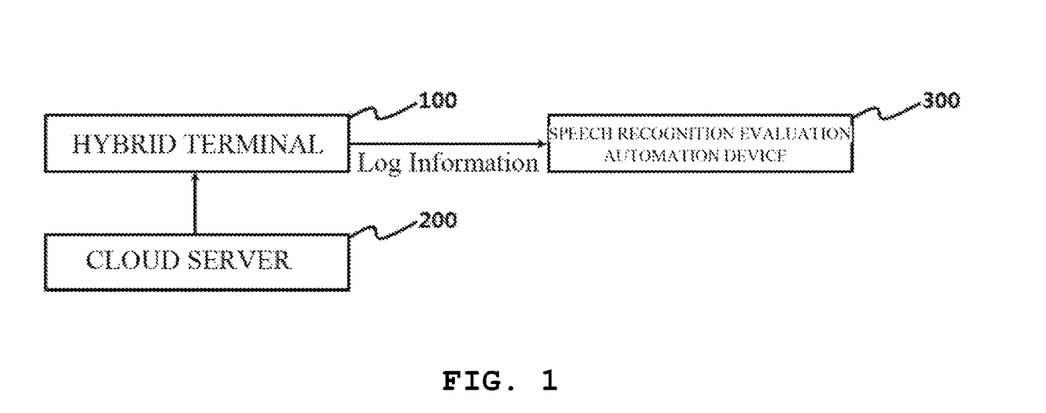
FIG. 1 is a diagram schematically illustrating an entire configuration of an automatic multi-performance evaluation system for hybrid speech recognition according to an embodiment of the present invention.

FIG. 1 is a diagram schematically illustrating an entire configuration of an automatic multi-performance evaluation system for hybrid speech recognition according to an embodiment of the present invention.

As illustrated in FIG. 1, the system broadly includes a hybrid terminal 100, a cloud server 200, and a speech recognition evaluation automation device 300.

As described above, the system of the present invention processes speech recognition by simultaneously using the hybrid terminal and the cloud server and automatically evaluates speech recognition by analyzing logs using log information acquired from the speech recognition evaluation automation device.

That is, the hybrid terminal serves to yield results of embedded speech recognition, server speech recognition, embedded language understanding, and server language understanding, and a result of arbitration.

Detailed constituent means of each of the hybrid terminal, the cloud server, and the speech recognition evaluation automation device will now be described with reference to the attached drawings.

Figure 2:
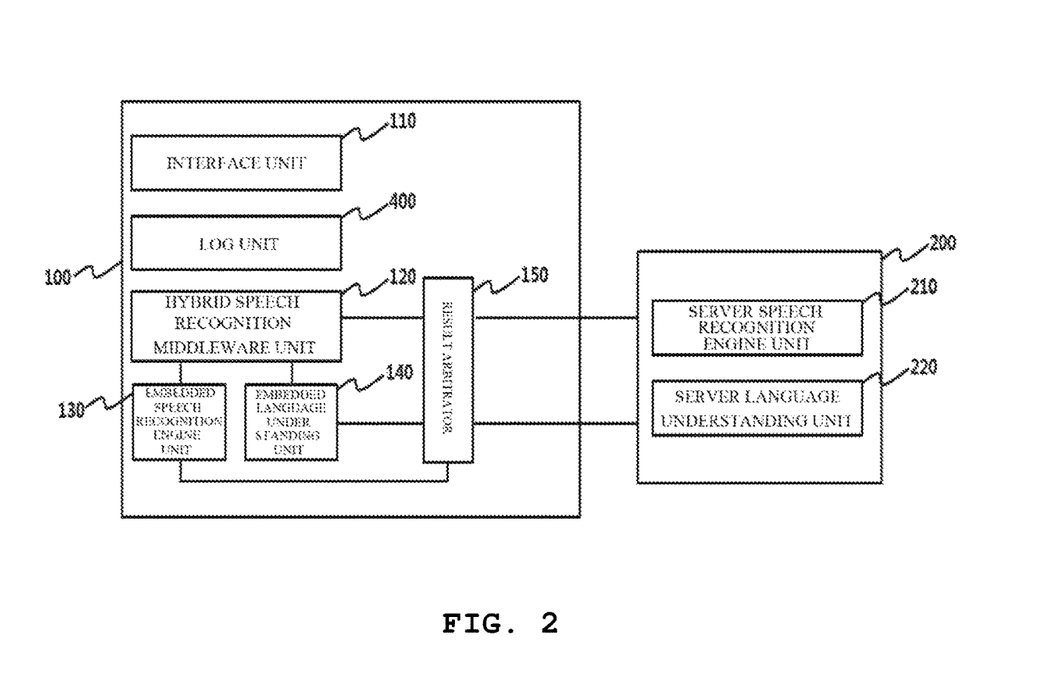
FIG. 2 is a block diagram of a hybrid terminal and a cloud server of the automatic multi-performance evaluation system for hybrid speech recognition according to an embodiment of the present invention.

FIG. 2 is a block diagram of a hybrid terminal and a cloud server of the automatic multi-performance evaluation system for hybrid speech recognition according to an embodiment of the present invention.

As illustrated in FIG. 2, the hybrid terminal 100 includes the interface unit 110, the hybrid speech recognition middleware unit 120, the embedded speech recognition engine unit 130, the embedded language understanding unit 140, the result arbitrator 150, and the log unit 400.

The interface unit 110 is connected to the speech recognition evaluation automation device 300 and provides log information stored in the log unit.

The interface unit 110 is connected to the speech recognition evaluation automation device 300 through a network.

The embedded language understanding unit 140 includes a natural language processing module and extracts a command target value of a user from a speech recognition result text processed by the natural language processing module.

The above-described embedded natural language understanding technology refers to a method of automatically extracting a command intention, which is a final goal of a user, and a detailed named entity, from a speech recognition result text by embedding the natural language processing module using a rule based algorithm or a statistical model in the interior of an electronic device. The embedded language understanding unit extracts a command target value of the user from the speech recognition result text processed by the natural language processing module.

Technology of extracting the command target value of the user is generally known and, therefore, a detailed description thereof will be omitted.

The embedded speech recognition engine unit 130 serves to extract a recognition result value by recognizing a result of approximating to a pre-input word or sentence as a command based on the extracted command target value of the user.

The above-described embedded speech recognition technology uses a speech recognition DB and model, a pattern matching algorithm etc, embedded in the electronic device. The embedded speech recognition engine unit recognizes a result of approximating to a pre-input word or sentence as a command and extracts a recognition result value.

That is, speech recognition is usually performed based on a recognition grammar capable of being understood by a recognizer. A list of recognition targets is determined and only the list of recognition targets may be output as a result of recognition.

Meanwhile, the cloud server 200 includes, as illustrated in FIG. 2, the server language understanding unit 220 and the server speech recognition engine unit 210.

The server language understanding unit 220 acquires voice transmitted by the hybrid terminal and extracts a command target value of the user. Server-based natural language understanding technology serves to automatically extract a final speech recognition execution purpose by understanding an intention and a target of a speaker based on a sentence text output as a result of server speech recognition.

The server speech recognition engine unit 210 extracts a speech recognition result value based on the command target value of the user. According to server-based speech recognition technology, voice which is input to a microphone and other recording equipment included in an electronic device is transmitted to the cloud based server speech recognition engine unit. The server speech recognition engine unit transmits a result of recognizing voice to the hybrid terminal.

A conventional speech recognition system has separately used, according to service purpose, an embedded speech recognition scheme in which a speech recognition engine is embedded in the interior of a terminal such as a vehicle or a mobile device and a cloud based server speech recognition scheme for Internet voice search through a smartphone and information processing.

However, hybrid speech recognition technology, which can use an advantage of a high recognition rate of embedded speech recognition based on a recognition grammar and an advantage of server speech recognition based on sentence unit recognition, has been applied to the market.

According to hybrid speech recognition described in the present invention, an embedded speech recognition engine and a server speech recognition engine are simultaneously driven with respect to one utterance of a user. Therefore, an arbitration algorithm for receiving two or more result values and using a better value of the two or more values to drive a command is in charge of a core role.

To use the better result value for driving the command using the arbitration algorithm, the result arbitrator 150 is provided.

That is, the result arbitrator 150 compares the command target value extracted from the speech recognition result text provided by the embedded language understanding unit, the recognition result value extracted by recognizing the result of approximating to the pre-input word or sentence provided by the embedded speech recognition engine unit as the command, the extracted command target value of the user by the server language understanding unit of the cloud server, and the speech recognition result value provided by the server speech recognition engine unit of the cloud server, designates any one recognition result value as a driving command value, and provides the designated value to the hybrid speech recognition middleware unit.

Hereinafter, a description will be given by defining the command target value extracted from the speech recognition result text provided by the embedded language understanding unit as embedded language understanding, defining the recognition result value extracted by recognizing, as the command, the result of approximating to the pre-input word or sentence provided by the embedded speech recognition engine unit as embedded speech recognition, defining the extracted command target value of the user by the server language understanding unit of the cloud server as server language understanding, defining the speech recognition result value provided by the server speech recognition engine unit of the cloud server as server speech recognition, and defining the driving command value arbitrated by the result arbitrator as an arbitration result.

The hybrid speech recognition middleware unit 120 stores the driving command value provided by the result arbitrator in the log unit 400.

That is, the hybrid speech recognition middleware unit 120 selects a result finally output by the hybrid terminal 100 and transfers log information to the speech recognition evaluation automation device 300 through the interface unit 110.

The hybrid speech recognition middleware unit 120 may perform driving of various combinations of cases including the case in which the embedded speech recognition engine unit 130 and the server speech recognition engine unit 210 are sequentially or simultaneously driven, the case in which up to the result arbitrator 150 is driven, and the case in which up to the embedded language understanding unit or the server language understanding unit is driven.

A result of recognition output through the hybrid speech recognition middleware unit 120 is stored in the log unit 400 and the log information stored in the log unit 400 is transmitted to the automation controller 310 through the interface unit 110.

The log unit 400 stores the driving command value as the log information.

The log information includes information for automation processing such as speech recognition start time information, microphone open/close information, and voice duration extraction information and includes recognition result and guidance information such as speech recognition result information, scenario transition information, and guide prompt output information.

Figure 3:
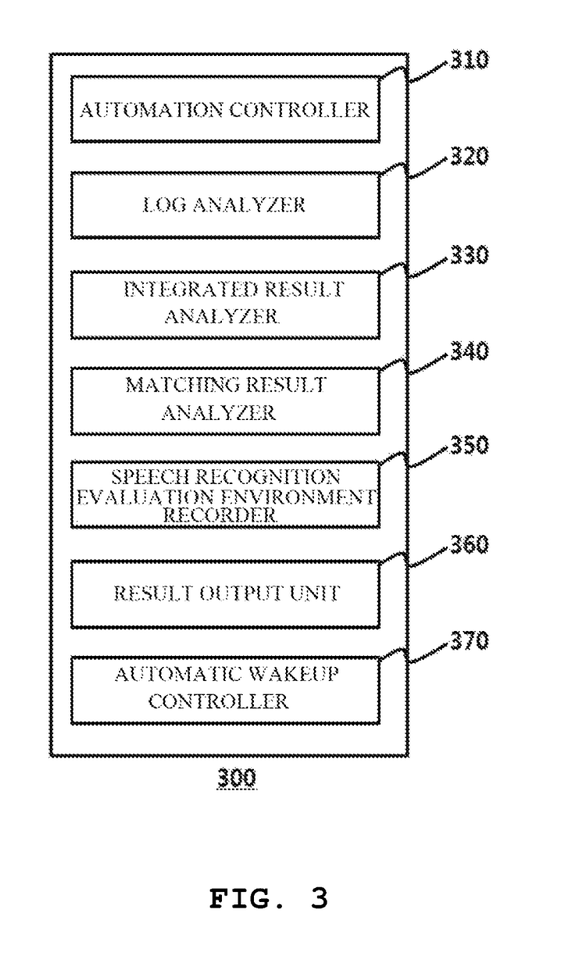
FIG. 3 is a block diagram of a speech recognition evaluation automation device of the automatic multi-performance evaluation system for hybrid speech recognition according to an embodiment of the present invention.

FIG. 3 is a block diagram of a speech recognition evaluation automation device of the automatic multi-performance evaluation system for hybrid speech recognition according to an embodiment of the present invention.

As illustrated in FIG. 3, the speech recognition evaluation automation device 300 includes the automation controller 310, the log analyzer 320, the integrated result analyzer 330, the matching result analyzer 340, the speech recognition evaluation environment recorder 350, and the result output unit 360.

As described above, if the speech recognition evaluation automation device is used, a function of automating a test in an actual vehicle environment may be performed and automation evaluation may be performed by immediately connecting a speech recognition system mounted in a navigation system and an audio terminal installed in a vehicle without any modification.

A detailed constituent means will now be described.

An automatic wakeup controller 370 provides a speech recognition driving command to the automation controller when a user presses a voice button.

That is, the automatic wakeup controller 370 is a constituent means for determining the start or end of speech recognition and performs a control operation to drive speech recognition for a vehicle by pressing a button or drive speech recognition for a vehicle by recognizing a determined call command.

For example, an evaluation execution process is needed to automatically evaluate speech recognition used in a vehicle and, at the very first time point and a repetition start time point of the evaluation execution process, the automatic wakeup controller 370 is driven.

Since a conventional automatic test scheme does not consider an evaluation environment in which physical input of a speech recognition start key of a navigation system is needed, there are problems in automatic evaluation. However, the automatic wakeup controller is configured as described above and a physically automated start method is applied, thereby solving the above problems.

The automation controller 310 for simply connecting serial communication without an additional operation and automatically controlling a speech recognition start button (push-to-talk (PTT) button) attached to a vehicle steering wheel at a proper timing is required.

Upon acquiring a speech recognition driving command value from the automatic wakeup controller, the automation controller 310 provides log information provided by the interface unit of the hybrid terminal to the log analyzer.

Figure 4:
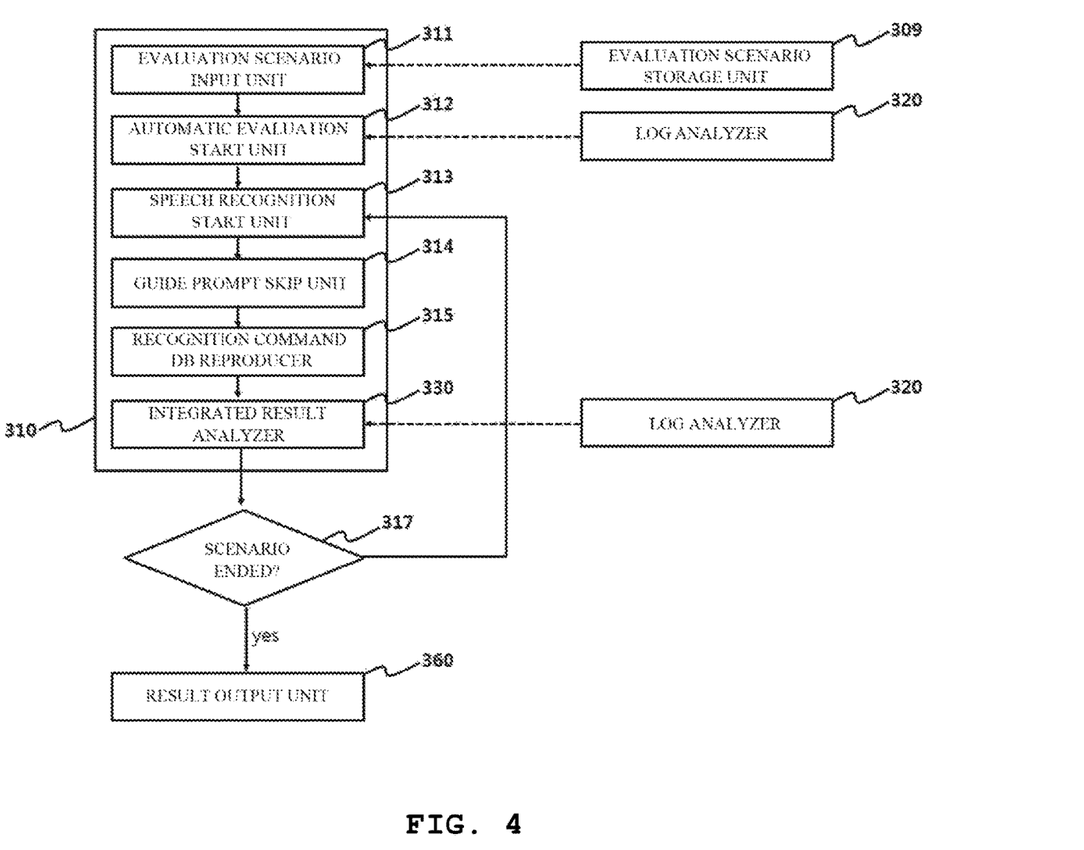
FIG. 4 is a block diagram of an automatic controller of the automatic multi-performance evaluation system for hybrid speech recognition according to an embodiment of the present invention.

The automation controller performs an entire automatic evaluation process for speech recognition. To this end, the automation controller includes, as illustrated in FIG. 4, an evaluation scenario input unit 311, an evaluation scenario storage unit 309, an automatic evaluation start unit 312, a speech recognition start unit 313, a guide prompt skip unit 314, a recognition command DB reproducer 315, and a scenario end determiner 317.

The evaluation scenario storage unit 309 stores an evaluation scenario and receives the evaluation scenario from the evaluation scenario input unit 311.

Herein, all evaluation lists and order information are uploaded by the evaluation scenario input unit.

The automatic evaluation start unit 312 performs automatic evaluation for speech recognition from the beginning of the evaluation scenario, using information about a speech recognition start time point, a speech recognition end time point, and a prompt output time point, analyzed by the log analyzer. The automatic evaluation start unit 312 activates the speech recognition start unit to automatically perform speech recognition.

Specifically, if automatic evaluation is started, speech recognition is automatically started or ended using the information about the speech recognition start time point, the speech recognition end time point, and the prompt output time point, analyzed by the log analyzer 320.

The automatic evaluation start unit 312 starts automatic evaluation for speech recognition from the beginning of the evaluation scenario and pages the speech recognition start unit 313 so as to automatically perform speech recognition.

To start to perform speech recognition, a PTT button or a wakeup command needs to be executed and, in this case, the automatic evaluation start unit 312 automatically pages the automatic wakeup controller to physically start to perform speech recognition.

The speech recognition start time point is checked through analysis of log information and is automatically set by analyzing logs performed at an interval of a predetermined time.

Meanwhile, if speech recognition is started, a guide prompt is generated and a beep sound which indicates a timing at which a user should say a command is generated. In this case, the guide prompt skip unit 314 may stop generating the guide prompt so that an entire test time can be reduced.

The recognition command DB reproducer 315 outputs recorded voice information after the beep sound is generated.

That is, after the beep sound is generated, automatically recorded voice information, instead of voice information recorded by a user, is output by the recognition command DB reproducer 315.

After the integrated result analyzer 330 processes a result of recognition, the scenario end determiner 317 determines whether a scenario is ended. If an evaluation item remains according to the evaluation scenario, the speech recognition start unit 313 starts to perform speech recognition again. If the evaluation should be ended, the result output unit 360 ends evaluation and outputs the result of evaluation on paper or through a screen.

That is, the scenario end determiner 317 determines whether an evaluation item is present according to the evaluation scenario. If no evaluation item is present, the evaluation scenario is ended.

The log analyzer 320 serves to start or end speech recognition using the information about the speech recognition start time point and the speech recognition end time point, analyzed based on the log information.

That is, the log analyzer 320 analyzes the log information including information for automation processing, which contains speech recognition start time information, microphone open/close information, and voice duration extraction information and including information for recognition result and guidance, which contains the speech recognition result information, the scenario transition information, and the guide prompt output information.

Specifically, the automation controller for speech recognition based on a log analysis scheme through the log analyzer is a constituent means for controlling a terminal installed in, for example, a vehicle, and is used to solve problems generated when a conventional automation system requires installation of an additional program.

Recent vehicle speech recognition uses not only isolated-word based speech recognition which outputs a result of uttering a determined command such as "navigation" but also a machine learning based language processing technology which analyzes the meaning contained in utterance of the entire sentence unit given by a speaker, such as "I'd like to see the navigation system. Turn on the navigation system." and predicts intentions and behaviors of the speaker. Therefore, speech recognition rate needs to be calculated by tracking a branching scenario according to the operation results of the embedded language understanding unit 140 and the server language understanding unit 220.

Therefore, the integrated result analyzer may individually or complexly analyze automatic verification of the embedded speech recognition result, automatic verification of the embedded language understanding result, automatic verification of the server speech recognition result, automatic verification of the server language understanding result, and verification of the arbitration result and output the analyzed result to the result output unit.

Since the integrated result analyzer may complexly analyze the embedded speech recognition result, the embedded language understanding result, the server speech recognition result, and the server language understanding result, even when embedded speech recognition or server speech recognition is randomly performed, the integrated result analyzer may automatically perform result processing and analysis.

A conventional evaluation system mainly uses a scheme of installing an agent program in a navigation terminal. However, since this scheme may cause system overhead and malfunction, the above problems may be solved using log analysis through the log analyzer.

Next, the constituent means and operation of the integrated result analyzer 330 will be described in detail with reference to FIG. 5.

Figure 5:
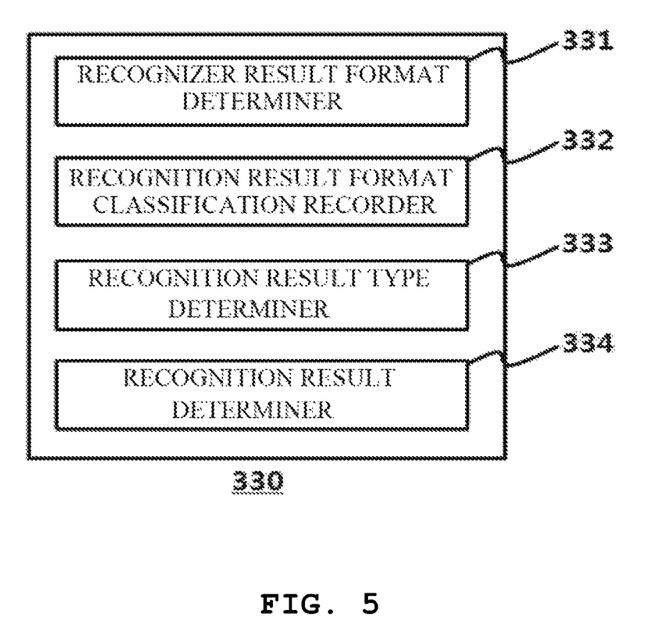
FIG. 5 is a block diagram of an integrated result analyzer of the automatic multi-performance evaluation system for hybrid speech recognition according to an embodiment of the present invention.

The integrated result analyzer 330 illustrated in FIG. 5 analyzes, based on the log information, the command target value extracted from the speech recognition result text of the hybrid terminal, the recognition result value extracted by recognizing the result of approximating to the pre-input word or sentence as the command, the extracted command target value of the cloud server, the speech recognition result value, and the driving command value designated by the result arbitrator and calculates an evaluation result.

That is, the evaluation result is calculated by analyzing the embedded speech recognition result, the embedded language understanding result, the server speech recognition result, the server language understanding result, and the arbitration result. Finally, only one operation is provided to a driver.

To perform the above-described functions, the integrated result analyzer 330 includes a recognition result format determiner 331, a recognition result format classification recorder 332, a recognition result type determiner 333, and a recognition result determiner 334.

The recognition result format determiner 331 analyzes different formats of the command target value extracted from the speech recognition result text of the hybrid terminal, the recognition result value extracted by recognizing the result of approximating to the pre-input word or sentence as the command, the extracted command target value of the cloud server, the speech recognition result value, and the driving command value designated by the result arbitrator and determines types of result formats. The determined types of the result formats are recorded in the recognition result format classification recorder 332.

The recognition result type determiner 333 determines which of the hybrid terminal and the cloud server performs speech recognition with reference to the recorded types of the result formats. Specifically, the recognition result type determiner 333 determines which of the embedded recognition result, the embedded language understanding result, the server recognition result, the server language understanding result, and the arbitration result corresponds to the analyzed result.

In this case, the recognition result determiner 334 records the determined result value as a final recognition result value.

The final recognition result value is provided to the result output unit 360 according to the result formats and is displayed on a screen UI.

Meanwhile, the speech recognition evaluation automation device 300 of the present invention may further include, as illustrated in FIG. 3, the matching result analyzer 340.

The matching result analyzer 340 analyzes whether a result value which is identical to a voice command of a user is output on a terminal screen to determine whether a voice confirmation announcement matching the voice command of the user is output.

That is, the matching result analyzer 340 complexly evaluates whether screen display, which is output as a final result, is proper and whether a voice announcement is valid and analyzes matching of screen output and matching of voice output so as to confirm a recognition rate and a normal operation.

To this end, the matching result analyzer 340 includes a screen output matching verification module for recognizing change of a screen graphical user interface (GUI) through a camera after speech recognition is performed and comparing screen output with a correct answer screen to distinguish between differences and includes a voice output matching verification module for determining matching between voice announcement output sound as a result of speech recognition and a correct answer voice announcement.

The screen output matching verification module acquires the image information captured by transmitting an operation signal to the camera and compares the image information with a prestored correct answer screen, thereby distinguishing between differences.

The voice output matching verification module determines matching by comparing a repeat-after-me voice announcement or voice announcement output sound which should be accurately output from a specific scenario with a correct answer voice announcement.

The results of screen output verification and voice output verification are provided to the integrated result analyzer 330. The integrated result analyzer maps the provided results to the analyzed evaluation result, thereby complexly evaluating recognition performance and operation performance.

Generally, since recognition performance and operation performance are separately measured, twice as much time is consumed relative to single performance measurement. However, according to the present invention, two-performance evaluation can be automatically performed as described above.

Information about the analyzed matching result is provided to the result output unit.

The speech recognition evaluation automation device 300 of the present invention may further include, as illustrated in FIG. 3, the speech recognition evaluation environment recorder 350.

The speech recognition evaluation environment recorder 350 records surrounding environment information when speech recognition is performed with reference to camera images stored in a memory and CAN communication information.

A vehicle includes, for example, a camera image unit which captures images capable of being aware of a road surface, weather, and a surrounding situation in an environment in which the vehicle actually travels and acquires camera images through a memory in which captured information is stored.

In addition, a CAN communication analyzer analyzes speed, engine state, air conditioner state, etc., thereby acquiring analyzed CAN communication information.

In this case, the speech recognition evaluation environment recorder 350 records the surrounding environment information when speech recognition is performed with reference to the camera images and CAN communication information.

Finally, the result output unit 360 simultaneously outputs the evaluation result calculated by the integrated result analyzer, the matching verification result analyzed by the matching result analyzer, and the surrounding environment information recorded by the speech recognition evaluation environment recorder.

Accordingly, verification for multiple performance of the speech recognition system can also be advantageously performed.

A general speech recognition system can confirm throughput only after result output and voice output as well as a recognition rate are confirmed.

Therefore, a problem of increasing a time consumed to perform separately performed tests can be solved so that the entire test time can be remarkably reduced relative to the separately performed tests.

In addition, since screen confirmation and output voice confirmation which have conventionally been manually performed can be simultaneously performed during evaluation of a recognition rate, high utilization can be assured relative to a conventional system which evaluates only the recognition rate.

A cause of deterioration in speech recognition performance needs to be analyzed based on the speech recognition automation evaluation result in order to improve speech recognition performance and, in this case, detailed information about a speech recognition execution situation provides a very important clue.

According to the present invention, the camera images capable of confirming various conditions, such as vehicle speed, air conditioning capacity, door open/close, road surface, and weather, and CAN information are obtained and are additionally recorded in the speech recognition execution information.

The above-described information about a surrounding environment while speech recognition is performed is used as very important information for achieving performance improvement and tuning of speech recognition. Depending on how accurate test state information can be provided, utilization of the evaluation system may differ. Therefore, the speech recognition evaluation environment recorder is configured as described above and the surrounding environment information is complexly output through the result output unit.

The system of the present invention can simultaneously process various speech recognition results. Simple and repeated automation which has been individually performed throughout several trials through a conventional performance evaluation system can be upgraded to a high-efficiency scheme capable of performing complex processing.

Multiple functions described in the present invention include matching of screen output, matching of voice announcement output, and recording of test environment information, in analyzing a speech recognition process performed in the interior of a hybrid speech recognition platform through logs and automatically evaluating performance of speech recognition. Through the multiple functions, the reliability of performance evaluation can be remarkably raised and systematic management of environment information can be performed.

In summary, the integrated result analyzer 330 for complexly analyzing different results of the hybrid speech recognition system and the matching result analyzer 340 for analyzing the environment and operation performance of speech recognition can achieve automation of hybrid result analysis and output of multiple verification results which have conventionally not been solved.

While the present invention has been particularly shown and described with reference to exemplary embodiments thereof, it will be understood by those of ordinary skill in the art that various changes in form and detail may be made herein without departing from the spirit and scope of the present invention as defined by the following claims and such modifications and variations should not be understood individually from the technical idea or aspect of the present invention.

INDUSTRIAL APPLICABILITY

The automatic multi-performance evaluation system for hybrid speech recognition according to the present invention individually or complexly analyzes automatic verification of a speech recognition result of a hybrid terminal, automatic verification of a language understanding result of the hybrid terminal, automatic verification of a speech recognition result of a cloud server, automatic verification of a language understanding result of the cloud server, and verification of an arbitration result of the interior of the system and outputs the analyzed result. Therefore, the system is high in industrial applicability.

What is claimed is:

1. An automatic multi-performance evaluation system for hybrid speech recognition, comprising:
 a hybrid terminal (100) including at least one computer configured to implement
 an embedded language understanding unit (140) including a natural language processing module, configured to extract a command target value of a user from a speech recognition result text processed by the natural language processing module,
 an embedded speech recognition engine unit (130) configured to recognize a result of approximating to a pre-input word or sentence as a command based on the extracted command target value of the user and extract a recognition result value,
 a result arbitrator (150) configured to compare the command target value extracted from the speech recognition result text provided by the embedded language understanding unit, the recognition result value extracted by recognizing the result of approximating to the pre-input word or sentence provided by the embedded speech recognition engine unit as the command, an extracted command target value of the user provided by a server language understanding unit of a cloud server, and a speech recognition result value provided by a server speech recognition engine unit of the cloud server, designate any one recognition result value as a driving command value, and provide the designated value to a hybrid speech recognition middleware unit,
 the hybrid speech recognition middleware unit (120) configured to store the driving command value provided by the result arbitrator in a log unit (400),
 the log unit (400) in which the driving command value is stored, and
 an interface unit (110) connected to a speech recognition evaluation automation device (300), for providing log information stored in the log unit;
 the cloud server (200) including
 the server language understanding unit (220), the server language understanding unit being configured to acquire voice transmitted by the hybrid terminal and extract the command target value of the user, and
 the server speech recognition engine unit (210), the server language recognition engine unit being configured to extract the speech recognition result value based on the command target value of the user; and
 the speech recognition evaluation automation device (300), the speech recognition evaluation automation device including
 an automatic wakeup controller (370) configured to provide a speech recognition driving command to an automation controller when a voice button is pressed,
 the automation controller (310), the automation controller being configured to provide the log information provided by the interface unit of the hybrid terminal to a log analyzer upon acquiring the speech recognition driving command value,
 the log analyzer (320), the log analyzer being configured to start or end speech recognition using information about a speech recognition start time point and a speech recognition end time point analyzed based on the log information,
 an integrated result analyzer (330) configured to analyze, based on the log information, the command target value extracted from the speech recognition result text of the hybrid terminal, the recognition result value extracted by recognizing the result of approximating to the pre-input word or sentence as the command, the extracted command target value of the cloud server, the speech recognition result value, and the driving command value designated by the result arbitrator and calculating an evaluation result,
 a matching result analyzer (340) configured to analyze whether a result value identical to a user voice command is output on a terminal screen and analyze whether a voice confirmation announcement matching the user voice command is output,
 a speech recognition evaluation environment recorder (350) configured to record surrounding environment information when speech recognition is performed with reference to a camera image stored in a memory and controller area network (CAN) communication information, and
 a result output unit (360) configured to simultaneously output the evaluation result calculated by the integrated result analyzer, a matching verification result analyzed by the matching result analyzer, and the surrounding environment information recorded by the speech recognition evaluation environment recorder.

2. The automatic multi-performance evaluation system for hybrid speech recognition according to claim 1, wherein the automation controller (310) comprises
 an evaluation scenario storage unit (309) configured to store an evaluation scenario,
 an evaluation scenario input unit (311) configured to receive the evaluation scenario which is to be stored in the evaluation scenario storage unit,
 an automatic evaluation start unit (312) configured to perform automatic evaluation for speech recognition from a beginning of the evaluation scenario, using the information about the speech recognition start time point, the speech recognition end time point, and a prompt output time point, analyzed by the log analyzer, and activate a speech recognition start unit to automatically perform speech recognition,
 the speech recognition start unit (313), the speech recognition start unit being configured to automatically perform speech recognition according to control of the automation evaluation start unit,
 a guide prompt skip unit (314) configured to stop a guide prompt in order to reduce a test time when speech recognition is performed,
 a recognition command database (DB) reproducer (315) configured to output recorded voice information after a beep sound is generated, and
 a scenario end determiner (317) configured to determine whether an evaluation item is present according to the evaluation scenario and stop the evaluation scenario when the evaluation item is not present.

3. The automatic multi-performance evaluation system for hybrid speech recognition according to claim 1, wherein the integrated result analyzer (330) comprises
 a recognition result format determiner (331) configured to analyze different formats of the command target value extracted from the speech recognition result text of the hybrid terminal, the recognition result value extracted by recognizing the result of approximating to the pre-input word or sentence as the command, the extracted command target value of the cloud server, the speech recognition result value, and the driving command value designated by the result arbitrator and determine types of result formats, a recognition result format classification recorder (332) in which the determined types of the result formats are recorded, a recognition result type determiner (333) configured to determine which of the hybrid terminal and the cloud server performs speech recognition with reference to the recorded types of the result formats, and a recognition result determiner (334) configured to record the determined result value as a final recognition result value.

4. The automatic multi-performance evaluation system for hybrid speech recognition according to claim 1, wherein the matching result analyzer (340) comprises a screen output matching verification module configured to recognize change of a screen graphical user interface (GUI) through a camera after speech recognition is performed and compare screen output with a correct answer screen to distinguish between differences, and a voice output matching verification module configured to determine matching between voice announcement output sound as a result of speech recognition and a correct answer voice announcement.

5. The automatic multi-performance evaluation system for hybrid speech recognition according to claim 1, wherein the log information includes information for automation processing including at least one of speech recognition start time information, microphone open/close information, or voice duration extraction information, and information for recognition result and guidance including at least one of speech recognition result information, scenario transition information, and guide prompt output information.

* * * * *